March 30, 1954  J. W. GRIFFETH  2,673,420
GARDEN PLANT SHADE
Filed Nov. 13, 1950
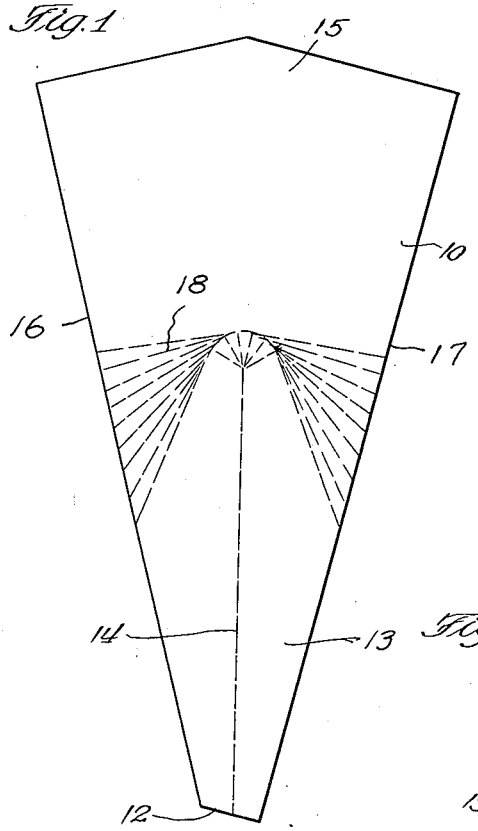
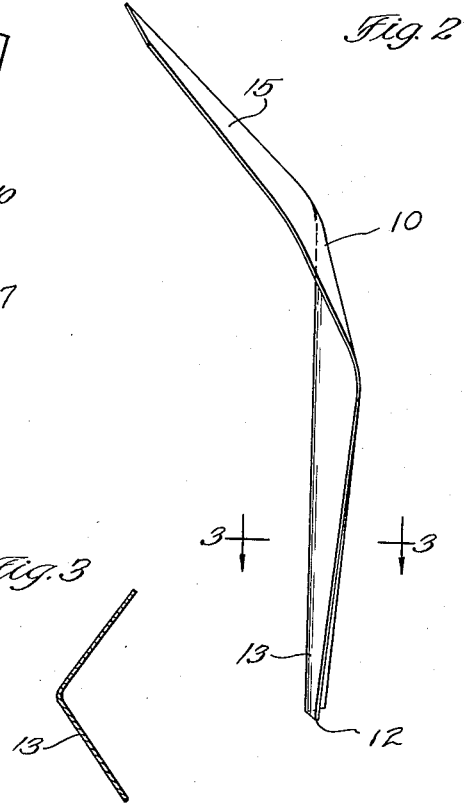
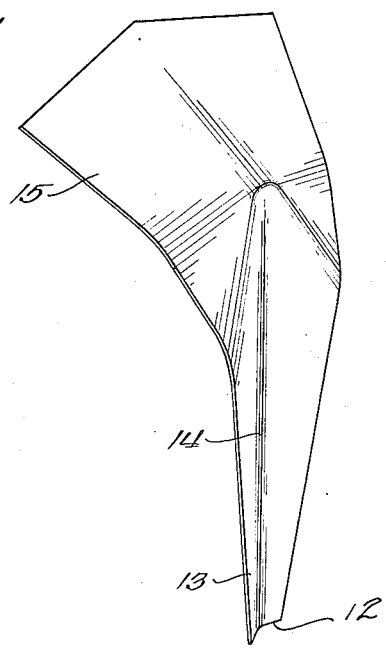
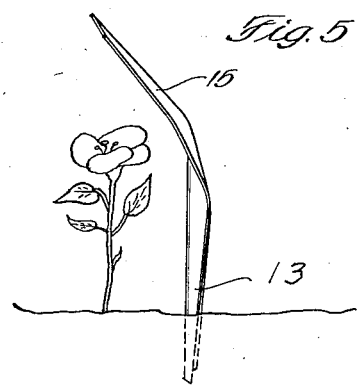
INVENTOR.
Jacob W. Griffeth
BY
ATTORNEYS Patented Mar. 30, 1954

2,673,420

UNITED STATES PATENT OFFICE 2,673,420

GARDEN PLANT SHADE

Jacob W. Griffeth, Portland, Oreg.

Application November 13, 1950, Serial No. 195,408

2 Claims. (Cl. 47—26)

The present invention relates to plant shades adapted for protecting young plants, and more particularly transplants, from the direct rays of the sun.

When transplanting young plants into the open ground, it is desirable to shield the young plants from the direct rays of the sun for several days. Plant shades have been devised heretofore for this purpose but they have usually been of such expensive construction as to render their usage impracticable by the average gardener.

It is a general object of the present invention, therefore, to provide a new and improved plant shade which has for its primary purpose a simple design rendering the same capable of manufacture at low cost.

More specifically, it is an object of the present invention to provide a new and improved plant shade which may readily be made from sheet metal, requiring only a single cutting and bending operation.

A still further object of the present invention is to provide a new and improved plant shade consisting merely of a unitary piece of relatively stiff sheet material cut and bent into a particular shape without requiring any further fabrication.

In accordance with the illustrated embodiment thereof the present invention consists of a unitary member of relatively stiff sheet material having a relatively wide upper end with opposite side edges converging toward a relatively narrow lower end, the upper end portion being bent at an angle with respect to the lower end portion and in a direction transversely thereof, the lower end portion being further stiffened by the provision of longitudinally extending grooves or corrugations whereby the plant shade may readily be inserted into the ground adjacent a plant to be shaded.

For a consideration of what is believed novel and inventive, the attention is directed to the following description taken in connection with the accompanying drawing, while the features of novelty will be pointed out with greater particularity in the appended claims.

In the drawings,

Fig. 1 is a flat plan view of a piece of sheet material cut into a preferred shape and showing the various lines along which the piece is to be bent;

Fig. 2 is a side elevation of the plant shade as constructed in accordance with one modification thereof;

Fig. 3 is a cross-sectional view taken along the line 3—3 of Fig. 2;

Fig. 4 is a view in perspective illustrating the plant shade as shown in Fig. 2; and Fig. 5 is a side elevation, to a reduced scale, illustrating the plant shade of the present invention in use.

Referring to the drawings, in Fig. 1 is illustrated in plan view an elongated unitary piece 10 of relatively stiff sheet material and which may, for example, be sheet steel, iron, aluminum, plastic, fiber or any other suitable relatively stiff and durable material. The member 10 is provided with a relatively wide upper end portion 15 and a relatively narrow lower end portion 13, the opposite side edges 16 and 17 thereof tapering, or converging, toward each other from the upper end portion 15 to the extreme lower end 12.

The member 10 is bent in the direction transversely thereof substantially as indicated best in Figs. 2 and 4 along the lines shown in dotted lines 18 in Fig. 1. The lower end portion 13 of the member 10 is bent along the longitudinal center line 14 bisecting the angle between the edges 16 and 17 in order to provide an angular cross-sectional configuration to the lower end portion substantially as indicated in Fig. 3, and for the purpose of stiffening the lower end portion of the shade in both the transverse and longitudinal directions. It will be obvious to those skilled in the art that by bending the lower end portion along some line such as the line 14, the upper end portion 15 will normally and naturally bend along the lines 18 and assume some angular position with respect to the lower end portion as shown in Figs. 2 and 4.

The extreme lower end 12 of the member 10 is preferably cut at a bias substantially as indicated in order to facilitate pushing the lower end of the member into the soil, as indicated in Fig. 5, adjacent a plant. With the device shaped as illustrated and described, it is very easy to push into the ground by holding the same in one hand and bearing down against the upper surface of the relatively wide upper end portion 15 with the palm of the hand, while holding the device with the fingers and thumb around the corresponding opposite side edges of the lower end portion. I have discovered that even a relatively light weight sheet material bent in this particular manner can easily be pushed into relatively firm ground without bending the plant shade out of shape. A plurality of these plant shades can be nested compactly together and shipped or stored with a minimum of space requirements.

An important feature of the present invention resides in the fact that the plant shades as described and shown may be formed from scrap sheet material and, moreover, for the manufacture thereof it is merely necessary to trim the stock of sheet material into blanks of elongated triangular configuration and then bend the lower end portion into an angular cross-sectional shape as shown and described. No further operations are required for the fabrication or completion of the article.

Having described the invention in what is considered to be a preferred embodiment thereof, it is desired that it be understood that the specific details shown are merely illustrative and that the invention may be carried out in other ways.

I claim:

1. A plant shade consisting of an elongated generally triangular unitary member of relatively stiff sheet metal material having a relatively wide upper end and a relatively narrow lower end, the opposite side edges of said member converging from said upper end to said lower end, said member being bent intermediate the opposite ends thereof in the direction transversely of the longitudinal direction thereof whereby said upper end portion extends at an angle with respect to the longitudinal direction of the lower end portion thereof, said lower end portion being bent along a line centrally bisecting the angle between said converging side edges into an angular cross-sectional configuration with said converging edges extending from the longitudinal direction of the lower end portion in a direction opposite to that in which said upper end portion extends therefrom, the opposite side parts of said lower end portion being substantially flat throughout their full width and length, the lower extremity of said member being adapted for insertion into the ground for supporting said shade in the upright position adjacent a plant.

2. A plant shade consisting of an elongate, generally triangular unitary member of relatively stiff sheet material having a relatively wide upper end and a relatively narrow lower end, the opposite side edges of said member converging from said upper end to said lower end, the lower end portion of said member being bent along a line centrally bisecting the angle between said converging side edges into an angular cross-sectional configuration, the opposite side parts of said lower end portion being substantially flat throughout their full width and length, the lower extremity of said member being adapted for insertion into the ground for supporting said shade in an upright position adjacent a plant, said member being bent transversely in a relatively smooth curve over an intermediate transverse portion thereof whereby the upper end portion thereof extends in a direction opposite to the direction which said side parts extend whereby said upper end portion fits comfortably into the palm of a hand for insertion of the lower extremity of said member into the ground.

JACOB W. GRIFFETH.

References Cited in the file of this patent

UNITED STATES PATENTS

| Number | Name | Date |
|---|---|---|
| 2,006,672 | Combs | July 2, 1935 |
| 2,024,546 | Starkey | Dec. 17, 1935 |

FOREIGN PATENTS

| Number | Country | Date |
|---|---|---|
| 2,264 | France | Dec. 14, 1903 |
| | (Addition to No. 332,747) | |
| 13,118 | Great Britain | 1909 |